United States Patent
Yan et al.

(10) Patent No.: US 9,588,713 B2
(45) Date of Patent: Mar. 7, 2017

(54) LIGHTING DEVICE

(71) Applicant: PHILIPS LIGHTING HOLDING B.V., Eindhoven (NL)

(72) Inventors: Caijie Yan, Eindhoven (NL); Xu Zeng, Eindhoven (NL); Gang Song, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/021,734

(22) PCT Filed: Sep. 4, 2014

(86) PCT No.: PCT/EP2014/068775
§ 371 (c)(1),
(2) Date: Mar. 14, 2016

(87) PCT Pub. No.: WO2015/039873
PCT Pub. Date: Mar. 26, 2015

(65) Prior Publication Data
US 2016/0230962 A1    Aug. 11, 2016

(30) Foreign Application Priority Data

Sep. 17, 2013  (WO) ................. PCT/CN2013/001098
Nov. 26, 2013  (EP) ..................................... 13194397

(51) Int. Cl.
*F21V 7/00* (2006.01)
*F21V 13/00* (2006.01)
(Continued)

(52) U.S. Cl.
CPC .......... *G06F 3/0647* (2013.01); *G06F 3/0604* (2013.01); *G06F 3/065* (2013.01);
(Continued)

(58) Field of Classification Search
CPC .......... F21V 13/04; F21V 7/0025; F21V 7/10; F21V 7/041; F21Y 2101/02; G09F 13/04; G09F 13/12; G09F 13/14
(Continued)

(56) References Cited

U.S. PATENT DOCUMENTS

2006/0050200 A1   3/2006  Nagao
2006/0083023 A1   4/2006  Ayabe
(Continued)

FOREIGN PATENT DOCUMENTS

GB        2209422       5/1989
WO    WO2010002494      1/2010
WO    WO2011107914      9/2011

*Primary Examiner* — Sharon Payne

(57) ABSTRACT

The invention discloses an optical assembly comprising a plurality of optical components that are concentric to one another, each optical component having a partially reflective and partially transmissive interface with an oblique angle of incidence, and the reflectivity of the interface increasing with distance from a common center; a transitional optical component is provided between the light source and the first optical component in order to direct lights from a light source to the partially reflective and partially transmissive interface of the first optical component. By assembling the plurality of optical components, a much thinner lighting device (100) can be achieved.

12 Claims, 4 Drawing Sheets

(51) Int. Cl.
  *G09F 13/00*     (2006.01)
  *G06F 3/06*      (2006.01)
  *H04L 29/08*     (2006.01)
  *G06F 11/10*     (2006.01)
  *G06F 21/78*     (2013.01)
  *H04L 29/06*     (2006.01)

(52) U.S. Cl.
  CPC ............ *G06F 3/0607* (2013.01); *G06F 3/067* (2013.01); *G06F 3/0619* (2013.01); *G06F 3/0623* (2013.01); *G06F 3/0644* (2013.01); *G06F 3/0661* (2013.01); *G06F 3/0665* (2013.01); *G06F 3/0683* (2013.01); *G06F 3/0689* (2013.01); *G06F 11/1004* (2013.01); *G06F 21/78* (2013.01); *H04L 29/08* (2013.01); *H04L 63/0428* (2013.01)

(58) Field of Classification Search
  USPC ........................................................ 362/297
  See application file for complete search history.

(56) References Cited

U.S. PATENT DOCUMENTS

| | | |
|---|---|---|
| 2010/0033956 A1 | 2/2010 | Kirchberger et al. |
| 2010/0061096 A1 | 3/2010 | Sato |
| 2010/0079978 A1 | 4/2010 | Nakamura |
| 2010/0290232 A1* | 11/2010 | Wei .................... F21S 8/086 362/296.01 |
| 2011/0019404 A1* | 1/2011 | Chien .................. F21V 5/002 362/235 |

* cited by examiner

US 9,588,713 B2

LIGHTING DEVICE

CROSS-REFERENCE TO PRIOR APPLICATIONS

This application is the U.S. National Phase application under 35 U.S.C. §371 of International Application No. PCT/EP2014/068775, filed on Sep. 4, 2014, which claims the benefit of European Patent Application No. 13194397.9, filed on Nov. 26, 2013 and International Application No. PCT/CN2013/001098, filed Sep. 17, 2013. These applications are hereby incorporated by reference herein.

FIELD OF THE INVENTION

The invention relates to an optical assembly and a lighting device comprising the optical assembly, and it specifically relates to the lighting device having a flatter or thinner structure.

BACKGROUND OF THE INVENTION

A light box is a very popular lighting fixture in urban areas. Currently, two types of LED light box are available. The first one is a back-lit light box, see FIG. 1; it has multiple LED sources distributed over the back plate, so that sufficient light can be ensured. However, a bigger space and more LED sources are needed for operation of the back-lit type; this type of light box occupies too much space and consumes a lot of energy. The other one is an edge-lit light box, see FIG. 2; as its name implies, the LED sources are set at the sides, and a reflecting layer is provided at the back to reflect light from the LED sources. Even if the edge-lit type can be made thinner, the light emitted from the LED sources cannot extend far enough if the box is too big. The negative consequence is that the closer to the central part of the light box, the darker the light effect is, which in turn causes non-uniformity.

GB2209422A discloses an arrangement for a LCD display.

US2006/050200A1 discloses a prism sheet to be used as a display device.

SUMMARY OF THE INVENTION

It is an object of the present application to provide an optical assembly with a thinner size and uniform lights.

According to the present invention, the optical assembly comprises a plurality of optical components that are concentric to one another, thereby sharing a common center where a light source can be located, wherein each optical component has a partially reflective and partially transmissive interface with an oblique angle of incidence, and wherein for the plurality of optical components the reflectivity of the partially reflective interface increases with distance from the common center; a transitional optical component is provided between the light source and the first optical component in order to direct lights from a light source to the partially reflective and partially transmissive interface of the first optical component.

According to one embodiment of the present invention, the partially reflective and partially transmissive interface is set obliquely with its back towards the common center.

According to one embodiment, the transitional optical component is a cone-shaped body.

According to one embodiment, the optical assembly may be a concentric rectangle, polygon or circle.

According to one embodiment, the interfaces are coated with materials with different optical parameters at different wavelengths, so that different colors may be achieved. The optical parameters may be transmittance or reflectivity at certain wavelength.

Another object of the present application is to provide a lighting device comprising the optical assembly described above.

Another object of the present application is to provide a display apparatus for displaying content by means of the lighting device.

The display apparatus for displaying content may be a light box, a shop window, a gallery show window, a ceiling illumination with patterns or any other application. The content to be displayed may be posters, patterns, commercials, fashion models, clothing, exhibitions, etc.

Usually, the light distribution of a conventional light box or a shop window would generate many dark areas; and the light with higher power only surrounds the light source, which causes poor light effects and unnecessary light waste. The present application has solved the problem from two sides. First, the gradually increasing reflectivity of the reflecting interface of the optical components makes the lights reflected by each optical component more uniform. Secondly, the parallel optical components arranged in a radial shape improve the light uniformity as well, because the light emitted from the same light source can be distributed into as many different directions as possible. In addition, by engaging multiple modular optical assemblys to one another to form an array, even an illuminated area with a large surface area can be provided with a uniform light distribution. Another advantageous benefit is that the optical assembly can be made in a very small size, which brings down the cost, fits in with the trends of modern luminaires and allows it to be installed easier in any architecture or object.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EMBODIMENTS

In the following description, the present invention is described with reference to a light box, but this by no means limits the scope of the invention; for example, the present invention could be described with reference to a shopping window or other applications where it is needed.

Figure 1:
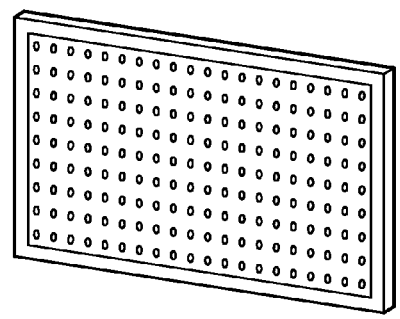
FIG. 1 and FIG. 2 show examples of a conventional light box.
Figure 2:
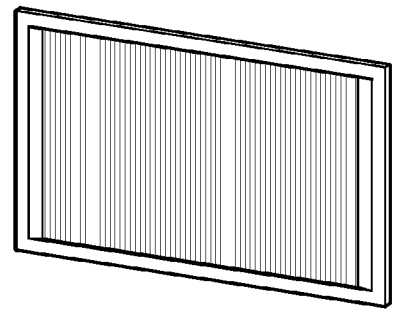
Figure 3:
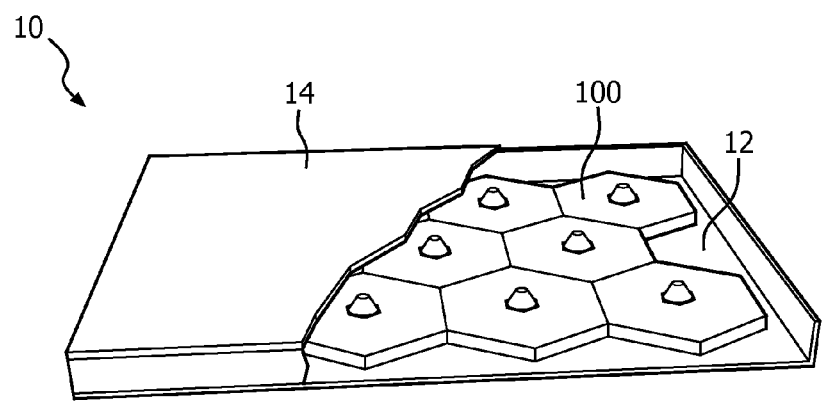
FIG. 3 illustrates a perspective view of a light box embodiment.

With reference to FIG. 3, the light box 10 comprises a front plate 12 and a back plate 14, both defining a space for a lighting device 100. The front plate is transparent; a diffuser may be provided in front of the front plate to further optimize the uniformity. The back plate 14 may be transparent or provided with reflecting materials. When a transparent back plate is used, the light beam generated behind the back plate, such as natural light or ambient light, can penetrate the whole lighting device, including the front plate, and eventually can be seen by people standing in front of the front plate, which can fulfill an energy saving function during daytime if the light box needs to be turned off.

Figure 4A:
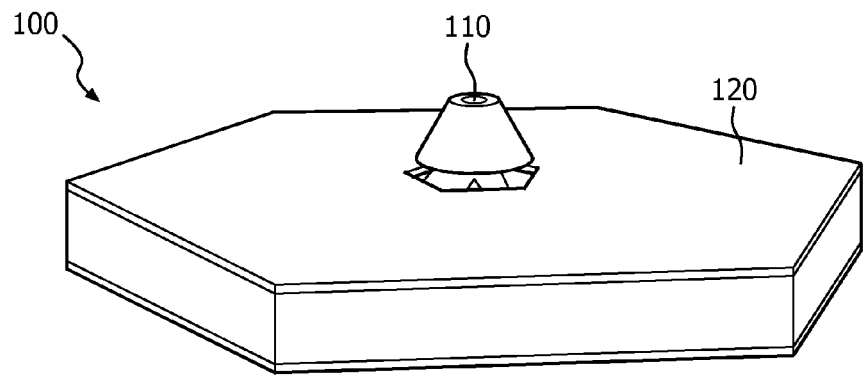
FIG. 4 (FIG. 4a, FIG. 4b and FIG. 4c) illustrates a perspective view of an embodiment of a lighting device of the present application.
Figure 4B:
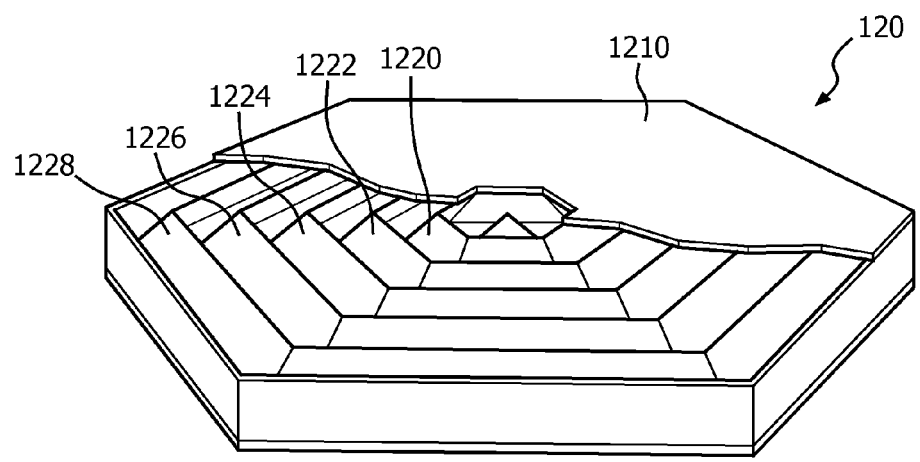
Figure 4C:
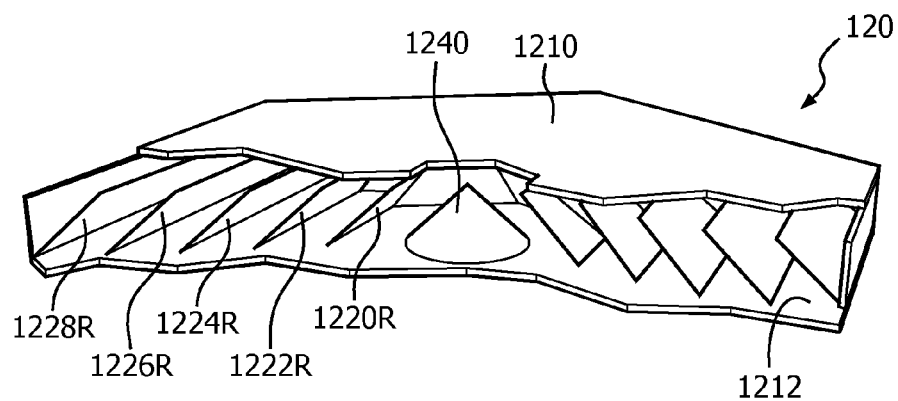

As FIG. 4a-FIG. 4c show, the lighting device 100 comprises one light source 110 and an optical assembly 120. The optical assembly 120 comprises a plurality of optical components (1220, 1222, 1224, 1226, 1228) that are concentric to one another, thereby sharing a common center where the light source is located; each optical component has a partially reflective interface (1220R, 1222R, 1224R, 1226R) with an oblique angle of incidence in relation to the light source 110, and for the plurality of optical components the reflectivity of the partially reflective interface increases with distance from the common center. In this embodiment, the optical assembly 120 is hexagon-shaped. It has five optical components arranged parallel to each other. Each optical component (1220, 1222, 1224, 1226, and 1228) actually is a hexagonal loop. A transitional optical component 1240 is provided below the LED source 110 and surrounded by the $1^{st}$ optical component 1220; in this embodiment, the transitional optical component 1240 may be a cone-shaped reflector, which may exhibit total reflection, or which allows the majority of light from the light source to be reflected but a small part to pass through in the original light direction.

Thus, it can be understood that the light emitted from the LED source 110 arrives first at the outer surface of the cone-shaped reflector 1240. The slope angle of the outer surface of the cone is designed in such a manner that the reflected light coming from the cone can be incident substantially laterally on the reflecting interface of the $1^{st}$ optical component 1220. In the embodiment shown by FIG. 4a-FIG. 4c, the oblique angle of incidence of each reflective interface in relation to the light source is set to 45°, and the slope angle of the outer surface of the cone is 45° as well. It has to be noted that the substantially perpendicular configuration enables energy to be used maximally, without limiting other variations where the relative position of the transitional component and the $1^{st}$ optical component is provided with other angles. Since each optical component is arranged obliquely in relation to the LED source, the light emitted from the LED source can be directed through the cone-shaped reflector 1240 to the reflecting interface (1220R) of the $1^{st}$ optical component 1220. Assuming there was a plane parallel to the front and back plate of the light box where the LED source is located on, all optical components would be provided with their back toward the assumed plane; therefore, the direction of the reflected light from the reflective interfaces eventually is substantially the same as that of the light emitted directly from the light source 110.

The reflecting interface (1220R, 1222R, 1224R, 1226R) of each optical component is partially reflective and coated for different reflectivity, the reflectivity increasing with distance from the LED source. As the table below shows, in this embodiment, the reflectivity of different optical component layers increases as the distance from the LED source increases. The reflectivity of the $1^{st}$ optical component 1220 is set to 0.0857, while that of the last one 1228 is 1.000. The optical components with a relatively smaller reflectivity value generate less reflecting light from a same amount of incident light, but allow more light to pass through them and arrive at the next optical component. As regards the last component 1228, all light received by it has to be reflected towards the front plate of the light box; for example, its reflectivity value is set to 1.000, which means no light needs to be transmitted through it.

To obtain different light effects, the reflecting interface of each optical component may be coated with materials with specific transmittance or reflectivity at different wavelengths, so that different colors may be shown accordingly.

| $i^{th}$ layer of mirror | 1 | 2 | 3 | 4 | 5 |
|---|---|---|---|---|---|
| Reflectivity | 0.0857 | 0.1563 | 0.2593 | 0.4500 | 1.000 |

Figure 5:
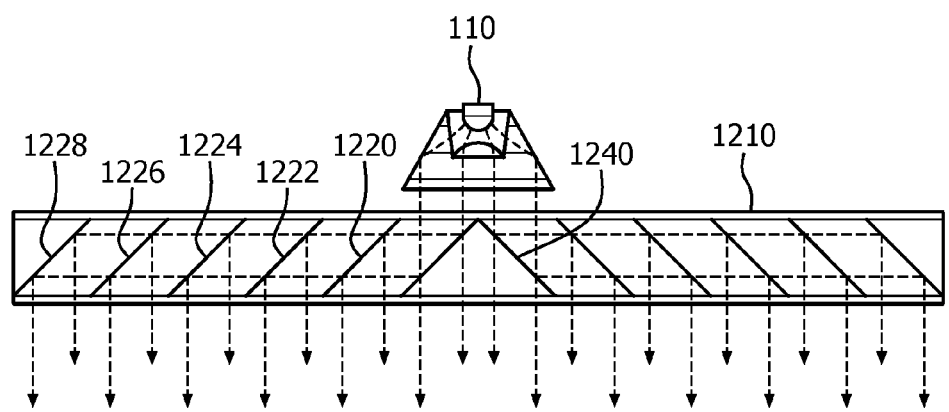
FIG. 5 illustrates a schematic diagram of the light path of FIG. 3.

FIG. 5 shows the light path of the lighting device. In the embodiment of FIG. 5, a collimation lens can be provided to the LED source, so that a collimated parallel light beam is obtained which is incident on the transitional optical component 1240, here being the cone-shaped reflector. In practice, the transitional optical component 1240 can be in different variants so as to have various shapes, as long as all or most of the reflected light coming from it can be laterally directed to the $1^{st}$ optical component 1220; for example, a polygon prism or an irregular shape to fit different requirements.

It is worth noting that the shape of the optical assembly 120 may be varied. The polygon may be a rectangle, an octagon, or other shape. The shape may also be a circle, as FIG. 6 shows, or a circle-like shape.

Figure 6:
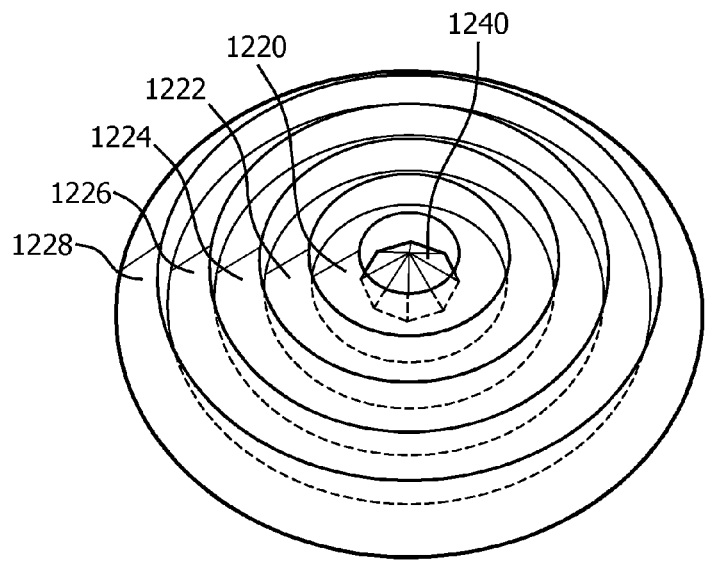
FIG. 6 illustrates another embodiment of a circular optical assembly of the present application.

In the embodiment of FIG. 6, the optical components (1220-1228) are partially reflecting layers with an annular shape. Accordingly, the light spot of the present embodiment exhibits a homogeneous circular light distribution. The transitional optical component 1240 is like a polygon prism. In accordance with the principle described above, the polygon prism is preferably provided in such a way that all or the majority of the reflected light issuing from the outer surface of the polygon prism travels substantially laterally to the reflecting interface of the $1^{st}$ optical component. The embodiment with a circular shape also covers other variations, such as ellipses or arcs. When a display area is more or less circular, the circular embodiment is more suitable; for example, in a gallery or an artistic environment, the display frame is more often designed in a circular shape.

Figure 7:
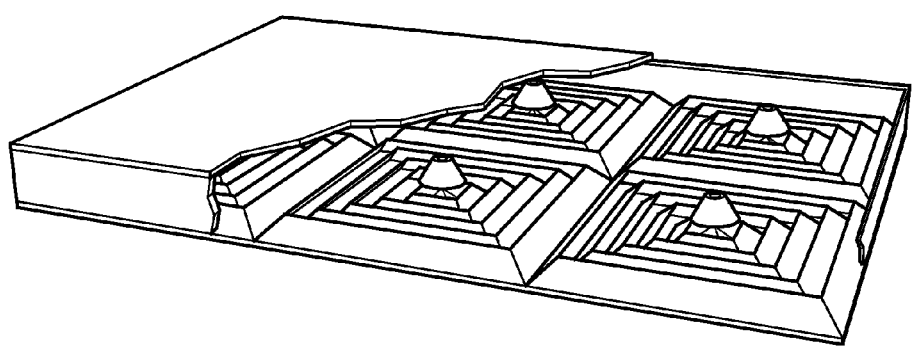
FIG. 7 illustrates a schematic diagram in which a plurality of lighting devices are engaged with one another to form an array.

Another advantage of the present application is that the optical assembly is modulized; therefore installation is quite easy. As FIG. 7 shows, the optical modules with a rectangular shape are engaged with one another to form an array, and are arranged so as to fill the light box. The rectangular lighting device produces rectangular light spots accordingly. No matter how large the required area has to be, such as a big shop window, the modulized optical assemblys can always meet the requirements. The rectangular lighting device can make maximum use of the space because most areas for luminaires are rectangles.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage.

The invention claimed is:

1. An optical assembly for use with a light source, the optical assembly comprising:

a plurality of optical components that are concentric to one another, thereby sharing a common center where the light source is can be located, wherein each optical component has a partially reflective and partially transmissive interface with an oblique angle of incidence, and wherein for the plurality of optical components the reflectivity of the interface increases with distance from the common center, and a transitional optical component provided between the light source and a first optical component of the plurality of optical components in order to direct light from the light source to the interface of the first optical component.

2. The optical assembly recited in claim 1, wherein the interface is provided obliquely in such a way that the direction of reflected light from the interface is substantially the same as that of light emitted directly from the light source.

3. The optical assembly recited in claim 1, wherein the transitional optical component is provided in such a manner that reflected light coming from the outer surface of the transitional component is incident substantially laterally on the interface of the first optical component.

4. The optical assembly recited in claim 3, wherein the transitional optical component is a cone-shaped body.

5. The optical assembly recited in claim 3, wherein the optical assembly as a whole takes a shape of a concentric rectangle, a polygon, or a circle.

6. The optical assembly recited in claim 1, wherein the interfaces of the plurality of optical components are coated with materials with different optical parameters at different wavelengths.

7. A lighting device, comprising at least one light source and at least one optical assembly as claimed in claim 1, the at least one light source being set in a common center of the at least one optical assembly.

8. The lighting device recited in claim 7, wherein the light source comprises a collimated lens.

9. The lighting device recited in claim 7, wherein more than one optical assembly are engaged with one another to form an array.

10. A display apparatus for displaying content comprising a lighting device recited in claim 7, further comprises a front plate and a back plate, together defining a chamber to accommodate the lighting device.

11. The display apparatus for displaying content recited in claim 10, wherein the front and back plate both are transparent.

12. The display apparatus for displaying content recited in claim 10, wherein the back plate is coated with reflective material.

* * * * *